US012156002B2

(12) United States Patent
Delplace et al.

(10) Patent No.: US 12,156,002 B2
(45) Date of Patent: Nov. 26, 2024

(54) PROCEDE D'AUTO-DIAGNOSTIC D'UN EQUIPEMENT DE RESTITUTION AUDIO

(71) Applicant: SAGEMCOM BROADBAND SAS, Rueil Malmaison (FR)

(72) Inventors: Stéphane Delplace, Rueil Malmaison (FR); Gilles Bourgoin, Rueil Malmaison (FR); Jérôme Berger, Rueil Malmaison (FR)

(73) Assignee: SAGEMCOM BROADBAND SAS, Rueil Malmaison (FR)

( * ) Notice: Subject to any disclaimer, the term of this patent is extended or adjusted under 35 U.S.C. 154(b) by 160 days.

(21) Appl. No.: 17/715,499

(22) Filed: Apr. 7, 2022

(65) Prior Publication Data

US 2022/0329956 A1 Oct. 13, 2022

(30) Foreign Application Priority Data

Apr. 9, 2021 (FR) ....................................... 2103681

(51) Int. Cl.
*H04R 29/00* (2006.01)
*H04R 5/04* (2006.01)

(52) U.S. Cl.
CPC ............. *H04R 29/002* (2013.01); *H04R 5/04* (2013.01)

(58) Field of Classification Search
CPC ................................ H04R 29/002; H04R 5/04
See application file for complete search history.

(56) References Cited

U.S. PATENT DOCUMENTS 11,729,572 B2 * 8/2023 Maher ...................... H04S 7/307 381/303
2017/0289717 A1 10/2017 Little
2018/0213340 A1 7/2018 Perrin et al.
2021/0176576 A1 * 6/2021 Usher .................. H04R 1/1091

FOREIGN PATENT DOCUMENTS

CN 108430026 A 8/2018
CN 109379689 A 2/2019
JP 2007124203 A 5/2007

OTHER PUBLICATIONS

Klippel et al., "Evaluation of Audio Performance over Product Life," AES Convention 142, May 2017, 14 pages.
IEC, "Sound System Equipment—Part 21: Acoustical (output-based) measurements," IEC International Standard, Nov. 7, 2018, pp. 1-77, 82 pages.

* cited by examiner

*Primary Examiner* — Andrew Sniezek
(74) *Attorney, Agent, or Firm* — MUNCY, GEISSLER, OLDS & LOWE, P.C.

(57) ABSTRACT

A self-diagnosis method performed in audio playback equipment including an audio playback unit having at least one loudspeaker and an audio capture unit having at least one microphone includes the steps of acquiring or producing emission audio test signals and outputting them via the loudspeaker(s), thereby producing sound test signals; acquiring reception audio test signals produced by the microphone(s) as a result of the microphones receiving the sound test signals; and analyzing the reception audio test signals in order to establish a first diagnosis of the audio playback unit and a second diagnosis of the audio capture unit.

17 Claims, 2 Drawing Sheets

PROCEDE D'AUTO-DIAGNOSTIC D'UN EQUIPEMENT DE RESTITUTION AUDIO

The invention relates to the field of audio playback equipment including loudspeakers and microphones.

BACKGROUND OF THE INVENTION

Nowadays, there exist many kinds of electronic equipment including both loudspeakers for playing back audio signals, and also microphones for capturing sound signals. By way of example, such equipment includes smartspeakers that can be used for performing voice recognition processes.

At present, when the user of such equipment observes that the equipment presents an acoustic defect, the user's only option is to take or send the equipment back to the vendor or to the manufacturer's after sales service. The equipment is then tested by the after sales service, and where possible (and if necessary), the after sales service repairs and/or recalibrates the equipment acoustically in order to make it operational again.

That solution is constraining for the user, since it requires the equipment still to be under guarantee. Furthermore, not only does the user need to cope with returning the equipment, but the user is also deprived of the equipment for a certain length of time (unless the vendor makes an immediate replacement available when the acoustic defect is reported).

That solution is also constraining for the manufacturer. Specifically, it often happens that the acoustic defects do not stem from the equipment itself, but rather from the way in which it is installed in the user's home. Furthermore, certain acoustic defects can be put right by acoustic recalibration that can perfectly well be performed in the user's home. The equipment being returned by the user and the operations that stem therefrom can thus often be pointlessly burdensome and expensive for the manufacturer.

OBJECT OF THE INVENTION

An object of the invention is to reduce, both for the user and for the manufacturer, the constraints that result from an acoustic defect occurring in audio playback equipment.

SUMMARY OF THE INVENTION

In order to achieve this object, there is provided a self-diagnosis method performed in audio playback equipment comprising an audio playback unit having at least one loudspeaker and an audio capture unit having at least one microphone, the self-diagnosis method comprising the steps of:

- acquiring or producing emission audio test signals and outputting them via the loudspeaker(s), thereby producing sound test signals;
- acquiring reception audio test signals produced by the microphone(s) as a result of the microphones receiving the sound test signals;
- analyzing the reception audio test signals in order to establish a first diagnosis of the audio playback unit and a second diagnosis of the audio capture unit.

Audio playback equipment can thus perform a first diagnosis of the audio playback unit by making use of the microphone(s), and a second diagnosis of the audio capture unit by making use of the loudspeaker(s). This mutual and complete self-diagnosis is performed entirely by the audio playback equipment, in independent manner, and thus does not require any external equipment (such as a test bench). The audio playback equipment can thus itself correct certain acoustic defects, for example by performing acoustic recalibration or by asking the user to change the position of the audio playback equipment. This serves to limit returns of audio playback equipment to the vendor or to the manufacturer. In the event of an irremediable failure, the self-diagnosis serves to target the origin of the defect better so as to improve handling of the defect.

The self-diagnosis method of the invention thus limits, both for the user and for the manufacturer, the constraints that result from an acoustic defect occurring in the audio playback equipment.

There is also provided a self-diagnosis method as described above, wherein the emission audio test signals comprise a first emission signal output by at least one first loudspeaker, and wherein the reception audio test signals comprise at least one first reception signal produced by at least one first microphone, the analysis comprising the step of verifying that the first emission signal is indeed present in the first reception signal.

There is also provided a self-diagnosis method as described above, comprising the step of detecting an irremediable failure of the first loudspeaker if the first emission signal is not present in the first reception signal.

There is also provided a self-diagnosis method as described above, comprising the steps, if the first emission signal is indeed present in the first reception signal, of detecting a residual noise signal that is also present in the first reception signal, of verifying whether the residual noise signal has a frequency higher than a predefined frequency and a level higher than a predefined level, the predefined frequency being greater than the frequency of the first emission signal and, if so, of detecting a sealing defect in a speaker enclosure of the audio playback equipment incorporating the first loudspeaker.

There is also provided a self-diagnosis method as described above, wherein the first emission signal comprises a first sinusoidal signal at a frequency of less than 100 hertz (Hz).

There is also provided a self-diagnosis method as described above, wherein the emission audio test signals include a second emission signal output by at least one second loudspeaker, and wherein the reception audio test signals include at least one second reception signal produced by at least one second microphone, the second emission signal comprising a succession of second sinusoidal signals presenting distinct second frequencies and forming a frequency sweep, the analysis comprising the steps, for each second sinusoidal signal, of measuring the level of the fundamental and the levels of harmonics of the second reception audio signal, and of detecting an acoustic defect of the second loudspeaker from said measurements.

There is also provided a self-diagnosis method as described above, comprising the step of calculating the ratio between the sum of the levels of the harmonics and the level of the fundamental, and detecting an audio defect from said ratio.

There is also provided a self-diagnosis method as described above, wherein the harmonics are the first five harmonics of the second reception signal, and wherein the detected defect is a defect internal to the second loudspeaker.

There is also provided a self-diagnosis method as described above, wherein the harmonics are the harmonics greater than the tenth harmonic of the second reception signal, and wherein the detected defect is a vibration defect that is manifested by the presence of first vibration levels that are too high at first vibration frequencies.

There is also provided a self-diagnosis method as described above, comprising the steps, if a vibration defect is detected, of asking a user to move the audio playback equipment, then of outputting once again the second emission signal and analyzing once again the second reception signal in order to evaluate second vibration levels at second vibration frequencies, and then of comparing the first vibration levels with the second vibration levels and/or the first vibration frequencies with the second vibration frequencies in order to determine whether the detected defect comes from positioning of the audio playback equipment or from a defect internal to the audio playback equipment.

There is also provided a self-diagnosis method as described above, wherein the emission audio test signals include a third emission signal output by at least one third loudspeaker, and wherein the reception audio test signals include at least a current third reception signal produced by at least one third microphone, the analysis comprising the steps of comparing the current third reception signal with at least one previously recorded preceding third reception signal, of detecting an acoustic defect from results of said comparison, and of performing acoustic recalibration of the audio playback equipment in order to correct said acoustic defect.

There is also provided a self-diagnosis method as described above, wherein the acoustic recalibration comprises modifying the audio equalization of an audio channel that includes the third loudspeaker.

There is also provided a self-diagnosis method as described above, wherein the emission audio test signals include a fourth emission signal output via at least one fourth loudspeaker that thus outputs a sound signal, the self-diagnosis method including the step of verifying that the sound signal has indeed been received by microphones under test.

There is also provided a self-diagnosis method as described above, including the step, if at least one first microphone under test has indeed received the sound signal and if at least one second microphone under test has not received the sound signal, of detecting an irremediable failure of the second microphone under test.

There is also provided a self-diagnosis method as described above, including the step, if none of the microphones under test has received the sound signal, of asking whether a user of the audio playback equipment has heard the sound signal, and:

- if not, of detecting an irremediable failure of the fourth loudspeaker;
- if so, of detecting an irremediable failure of the microphones under test.

There is also provided a self-diagnosis method as described above, further including the steps, prior to asking whether the user has heard the sound signal, of outputting once more the sound signal by using a fifth loudspeaker different from the fourth loudspeaker, and of detecting an irremediable failure of the fourth loudspeaker if the sound signal is indeed received this time by at least one of the microphones under test.

There is also provided audio playback equipment comprising a processor component, an audio playback unit including at least one loudspeaker, and an audio capture unit including at least one microphone, the self-diagnosis method as described above being performed in the processor component.

There is also provided audio playback equipment as described above, wherein the audio playback equipment is a smartspeaker.

There is also provided a computer program including instructions that cause the processor component of the audio playback equipment as described above to execute the steps of the self-diagnosis method as described above.

There is also provided a computer-readable storage medium, storing the above-described computer program.

The invention can be better understood in the light of the following description of a particular, nonlimiting implementation of the invention.

BRIEF DESCRIPTION OF THE DRAWINGS

Reference is made to the accompanying drawings, in which.

DETAILED DESCRIPTION OF THE INVENTION

Figure 1:
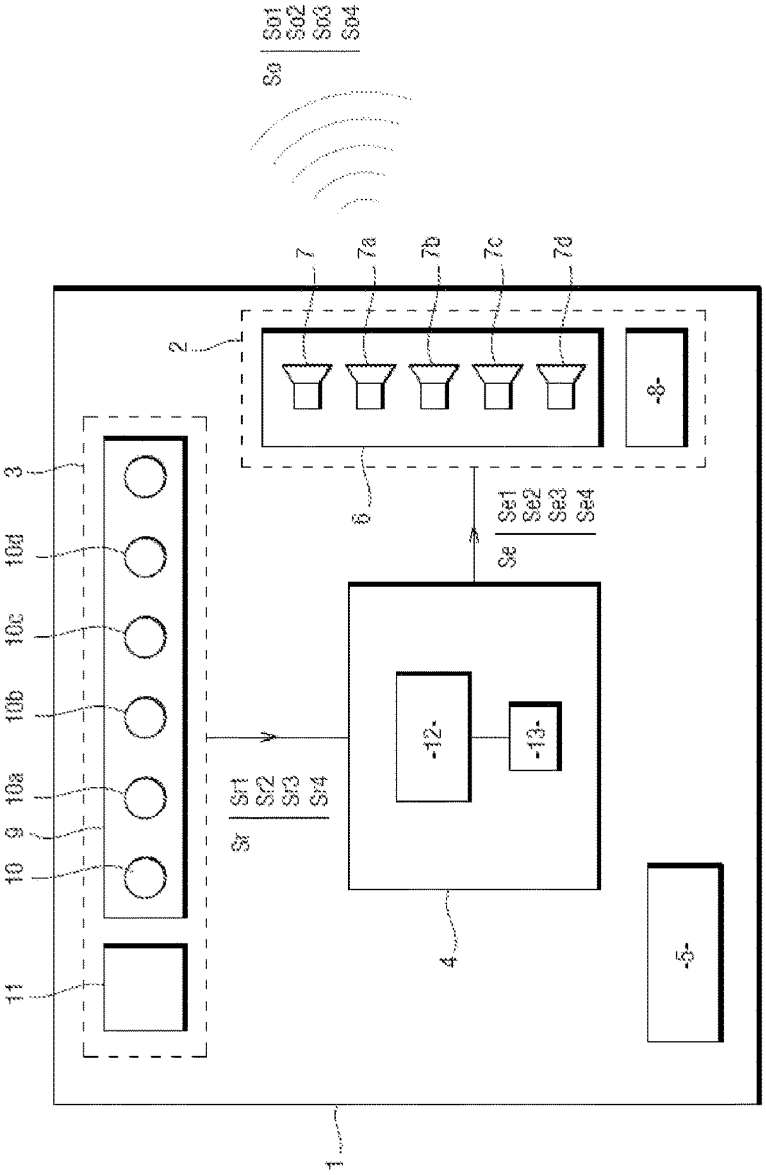
FIG. 1 shows a smartspeaker in which the self-diagnosis method of the invention is performed.

With reference to FIG. 1, in this example, the invention is performed in a piece of audio playback equipment, which is specifically a smartspeaker 1.

The smartspeaker 1 comprises an audio playback unit 2, an audio capture unit 3, a processor module 4, and a communication module 5.

The audio playback unit 2 comprises a loudspeaker set 6 comprising at least one loudspeaker 7, and specifically a plurality of loudspeakers incorporated in a speaker enclosure, together with electronic components 8 arranged to process and deliver audio signals sent to the loudspeakers 7, which then play back the audio signals by generating sound signals. The electronic components 8 include, in particular, amplifiers. The electronic components 8 form a plurality of audio channels, each of which is connected to one or more loudspeakers 7.

The audio capture unit 3 comprises a microphone set 9 comprising at least one microphone 10, and specifically a plurality of microphones, together with electronic components 11 arranged to acquire and to process reception audio signals as produced by microphones 10 when they capture sound signals. The electronic components 11 include, in particular, one or more analog-to-digital converters that transform of the analog audio signals produced by the microphones 10 into digital signals.

The measurement module 4 includes a processor component 12 that is adapted to execute instructions of a program for performing the self-diagnosis method of the invention. The program is stored in a memory module 13 comprising one or more memories of different types (volatile, nonvolatile) and connected to or incorporated in the processor component 12. By way of example, the processor component 12 may be a processor, a digital signal processor (DSP), a microcontroller, or indeed a programmable logic circuit such as a field programmable gate array (FPGA) or an application specific integrated circuit (ASIC).

The communication module 5 implements a wireless link, in this example using a Wi-Fi protocol. The communication module 5 serves to connect the smartspeaker 1 to a residential gateway situated in the home of the user of the smartspeaker 1. The smartspeaker 1 can thus be connected to a communications network (e.g. the Internet) via its communication module 5 and the residential gateway.

It should be observed that the link could be a wireless link of some other kind (e.g. a Bluetooth link), or indeed a wired link.

The self-diagnosis method of invention consists in acquiring or producing emission audio test signals Se and in outputting them via the loudspeaker(s) 7, thereby producing sound test signals So. The processor component 12 acquires reception audio test signals Sr produced by the microphone(s) 10 as a result of the microphones 10 receiving the sound test signals. The processor component 12 analyzes the reception audio test signals Sr in order to establish a first diagnosis of the audio playback unit 2 and a second diagnosis of the audio capture unit 3.

In the context of the first diagnosis of the audio playback unit 2, the processor component 12 thus begins by establishing a diagnosis relating to a first test group of loudspeakers and to the speaker enclosure.

The first test group of loudspeakers comprises at least one first loudspeaker 7*a* of the loudspeaker set 6. The first test group of loudspeakers that is targeted by this diagnosis may comprise a single loudspeaker, all of the loudspeakers, or indeed only some of the loudspeakers of the loudspeaker set 6.

Performing the diagnosis makes use of at least one first microphone 10*a* of the microphone set 9. In like manner, it is possible to use a single microphone, all of microphones, or indeed only some of the microphones of the microphone set 9.

In order to establish the first diagnosis, the emission audio test signals Se comprise a first emission signal Se1 that is output by the first loudspeaker(s) 7*a* of the first test group of loudspeakers. The first emission signal Se1 is a pre-recorded signal. For each first microphone 10*a*, the reception audio test signals Sr comprise a first reception signal Sr1 produced by said first microphone 10*a*.

Figure 2:
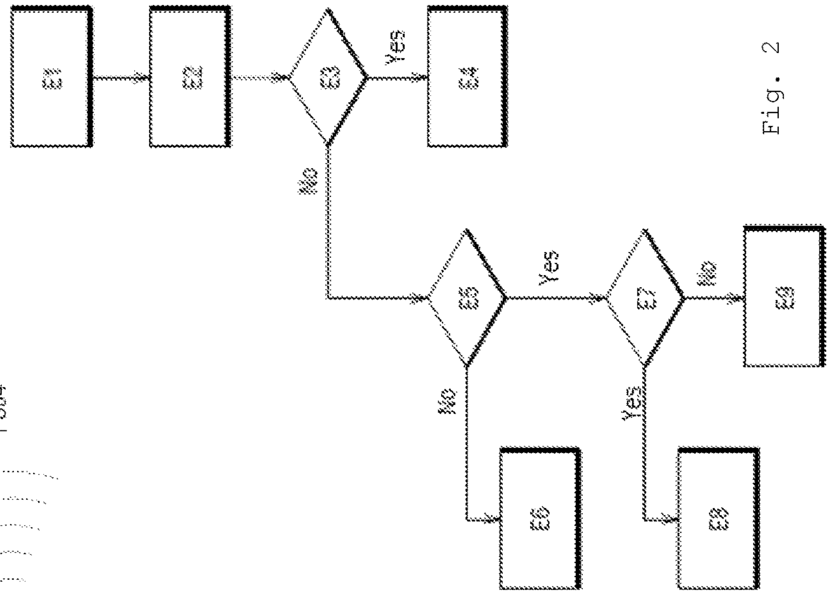
FIG. 2 shows steps of a first diagnosis.

With reference to FIG. 2, the processor component 12 produces the first emission signal Se1 and outputs it via the first test group of loudspeakers (step E1). The first emission signal Se1 is output by each of the first loudspeakers 7*a* in succession, each of which produces a respective first sound signal So1.

In this example, the first emission signal Se1 comprises a first sinusoidal signal at a frequency of less than 100 Hz, specifically equal to 50 Hz. The first sinusoidal signal is a pure sinewave.

For each first loudspeaker 7*a*, the first microphones 10*a* capture the first sound signal So1 produced by said first loudspeaker 7*a* (step E2).

Thereafter, the processor component 12 acquires the first reception signal Sr1 produced by each first microphone 10*a*.

For each first reception signal Sr1, the processor component 12 verifies whether the first reception signal Sr1 is or is not consistent with the first emission signal Se1 (step E3).

If so, the processor component 12 launches a stage of the acoustic recalibration, which is described below (step E4).

If not, the processor component 12 verifies whether the first emission signal Se1 is indeed present in the first reception signal Sr1 (step E5).

If the first emission signal Se1 is not present in the first reception signal Sr1, an irremediable failure of the first loudspeaker 7*a* is detected (step E6).

In step E5, if the first emission signal Se1 is indeed present in the first reception signal Sr1, then the processor component 12 analyzes the first reception signal Sr1 to detect a residual noise signal that is also present in the first reception signal Sr1.

The analysis is spectral analysis that makes use of a spectral measurement of the first reception signal Sr1.

The spectral measurement presents a peak at the frequency of the fundamental, possibly together with other peaks at the frequencies of harmonics (multiples of the fundamental).

By eliminating these peaks from the spectrum, the processor component 12 obtains the spectrum of the residual noise signal, which is normally at low level, and in any event well below the preceding peaks.

In the event of an air leak, the residual noise signal is observed to be at high level: it is the turbulence noise due to the leaking air flow.

It suffices to verify the level and the spectrum of this noise in order to verify whether or not there is a leak in the equipment (high level residual noise signal).

Thus, the processor component 12 verifies whether the residual noise signal has a frequency higher than a predefined frequency at a level higher than a predefined level, where the predefined frequency is higher than a first frequency of the first emission signal Se1 (step E7). If so, the processor component 12 detects a sealing defect in the speaker enclosure (step E8).

In step E7, if a sealing defect is not detected, then the processor component 12 launches a stage of acoustic recalibration (step E9).

It is stated above that the first emission signal Se1 is output by each first loudspeaker 7*a* in succession. Nevertheless, it is possible to cause the first emission signal Se1 to be output by a plurality of first loudspeakers 7*a* simultaneously. Under such circumstances, if a defect is detected, it is possible either to blame all of the first loudspeakers 7*a* concerned, or else to cause the first emission signal Se1 to be output again by the first loudspeakers 7*a* in succession in order to identify specifically the or each first loudspeaker 7*a* causing the defect.

In order to characterize a loudspeaker, it is possible to use an audio test signal other than a pure sine wave, for example it is possible to use pink noise or a frequency sweep.

A pure sine wave at a medium frequency (e.g. equal to 500 Hz) can be used only for verifying the presence of a loudspeaker.

A pure sine wave at a low frequency (e.g. equal to 50 Hz) can be used both for verifying the presence of a loudspeaker and also for ensuring that its speaker enclosure is leaktight.

Pink noise can be used to verify both the presence of a loudspeaker and also its frequency response.

A frequency sweep can be used to verify the presence of a loudspeaker, its frequency response, its total harmonic distortion (THD), and any parasitic vibration in the smartspeaker 1.

Performing the first diagnosis of the audio playback unit 2 may thus consist in detecting other defects.

The self-diagnosis method may establish a diagnosis for a second test group of loudspeakers comprising at least one second loudspeaker 7*b* of the loudspeaker set 6. The second test group of loudspeakers that is targeted by this diagnosis may comprise a single loudspeaker, all of the loudspeakers, or indeed only some of the loudspeakers of the loudspeaker set 6. The second loudspeaker(s) 7*b* may be the same as the first loudspeaker(s) 7*a*.

Performing the diagnosis makes use of at least one second microphone 10*b* of the microphone set 9. In like manner, it is possible to use a single microphone, all of microphones, or indeed only some of the microphones of the microphone set 9. The second microphone(s) 10*b* may be the same as the first microphone(s) 10*a*.

The emission audio test signals comprise a second emission signal Se2 that is output by the second loudspeaker(s) 7*b* of the second test group of loudspeakers. For each second microphone 10*b*, the reception audio test signals comprise a second reception signal Sr2 produced by said second microphone 10*b*.

In this example, in like manner, the second emission signal Se2 is output by each of the second loudspeakers 7*b* in succession.

In this example, the second emission signal Se2 comprises a succession of second sinusoidal signals presenting distinct second frequencies to form a frequency sweep. The second sinusoidal signals are pure sine waves.

The emission frequencies (i.e. the second distinct frequencies) may for example lie in the range 31.25 Hz to 1 kHz, at thirds of an octave, i.e.: 31.25 Hz×2^(N×⅓).

Naturally, the frequencies could be different and for example lie in the range 20 Hz to 2 kHz, in steps of a multiplying factor equal to 1.58:

20 Hz, 31.7 Hz, 50.2 Hz, . . . , 1.26 kHz, 2 kHz.

By way of example, each frequency may be output for 500 milliseconds (ms).

For each second loudspeaker 7*b*, the second microphones 10*b* capture the second sound signal So2 produced by said second loudspeaker 7*b*.

The processor component 12 acquires the second reception signal Sr2 produced by each second microphone 10*b*.

For each of the second sinusoidal signals of the second emission signal Se2, i.e. for each of the emission frequencies, the processor component 12 performs spectral analysis that, consists in measuring the level of a fundamental and the levels of harmonics in the second reception audio signal Sr2, and in detecting a defect from said measurements. The processor component 12 calculates the ratio between the sum of the levels of the harmonics and the level of the fundamental, and detects a defect from said ratio.

The level of the fundamental gives the frequency response of the audio playback unit 2. The harmonics are the multiples of the fundamental.

Distortion can be calculated by taking account of the first five harmonics of the second reception signal Sr2. Under such circumstances, any defect that is detected is a defect internal to the second loudspeaker 7*b*. By way of example, a detected defect may be deterioration of its diaphragm or of its suspension, a coil alignment defect, etc.

Furthermore, the ratio between the sum of the levels of harmonics greater than 10 and the level of the fundamental (known as "rub & buzz") gives an indication about the possible presence of vibration in the smartspeaker 1, on the same principle as for distortion. The presence of vibration has the effect of degrading THD.

Thus, The processor component 12 can detect a vibration defect by calculating the ratio between the sum of the levels of the harmonics and the level of the fundamental, with the harmonics that are taken into account in the second reception signal Sr2 being the harmonics greater than the tenth harmonic.

The defect that is detected is a vibration defect that is manifested by the presence of the first vibration levels in the smartspeaker 1 that are too high at first vibration frequencies. Each first vibration frequency is thus an emission frequency that is associated with a first vibration level (ratio between the sum of the levels of the harmonics and the level of the fundamental, i.e. said first vibration frequency) that is too high and symptomatic of a vibration defect. The processor component thus establishes a first list of frequencies at which the vibration level is greater than a predefined threshold, which by way of example may be equal to 5%.

If a vibration defect is detected, the processor component 12 makes use of the loudspeaker set 6 to communicate with the user and ask the user to move the smartspeaker 1.

Thereafter, the processor component 12 outputs the second emission signal Se2 once again via the second loudspeaker 7*b*, and once again analyzes the second reception signal Sr2 in order to evaluate second vibration levels at second vibration frequencies. Once again, the second vibration frequencies are the emission frequencies of the signal Se2.

The processor component attempts to detect second vibration levels that are too high in association with second vibration frequencies.

The processor component thus establishes a second list of frequencies at which the respective vibration levels are greater than the predefined threshold.

The processor component 12 then compares the first vibration levels with the second vibration levels and/or the first vibration frequencies with the second vibration frequencies, in order to determine whether the detected defect comes from the positioning of the smartspeaker 1 or from a defect that is internal to the smartspeaker 1.

Thus, if there are frequencies in common between the lists obtained for each measurement (first list for the measurement before moving the speaker enclosure, second list for the measurement after moving the speaker enclosure), the processor component considers that there is a vibration defect at those frequencies and that the defect is intrinsic to the smartspeaker 1.

In contrast, if the vibrations appear at different frequencies, they are inherent to the support and/or to the surroundings of the smartspeaker 1.

Optionally, for the second measurement, it is possible to make use only of those frequencies in the first list that were identified as being problematic during the first measurement, and to test at those frequencies only.

There follows a description of the above-mentioned stage of acoustic recalibration.

The stage of acoustic recalibration can be performed at any time, and for example it can be performed periodically, in order to ensure that the audio playback performance of the smartspeaker 1 is good.

As mentioned above, the stage of acoustic recalibration can also be performed after performing the first diagnosis, i.e. in steps E4 and E9: see FIG. 2.

The acoustic recalibration stage can also be performed when the existence of an acoustic defect is observed by comparing the most recent results with previous results that have been stored. The acoustic defect in question may consist in a frequency response that is inconsistent, e.g. due to vibration, and that requires recalibration in order to get closer to the initial acoustic characteristics.

Acoustic recalibration may involve a third test group of speakers comprising at least one third loudspeaker 7*c* of the loudspeaker set 6. The third test group of loudspeakers that is involved by this recalibration may comprise a single loudspeaker, all of the loudspeakers, or indeed only some of the loudspeakers of the loudspeaker set. The third loudspeaker(s) 7*c* may be the same as the first loudspeaker(s) 7*a* or as the second loudspeakers 7*b*.

Once again, use is made of at least one third microphone 10*c* of the microphone set 9. It is possible to use a single microphone, all of microphones, or indeed only some of the microphones of the microphone set 9. The third microphone (s) 10*c* may be the same as the first microphone(s) 10*a* or as the second microphone(s) 10*b*.

The emission audio test signals Se comprise a third emission signal Se3 that is output by the third loudspeaker(s) 7*c* of the third test group of loudspeakers. For each third microphone 10*c*, the reception audio test signals comprise a third reception signal Sr3 produced by said third microphone 10*c*.

Figure 3:
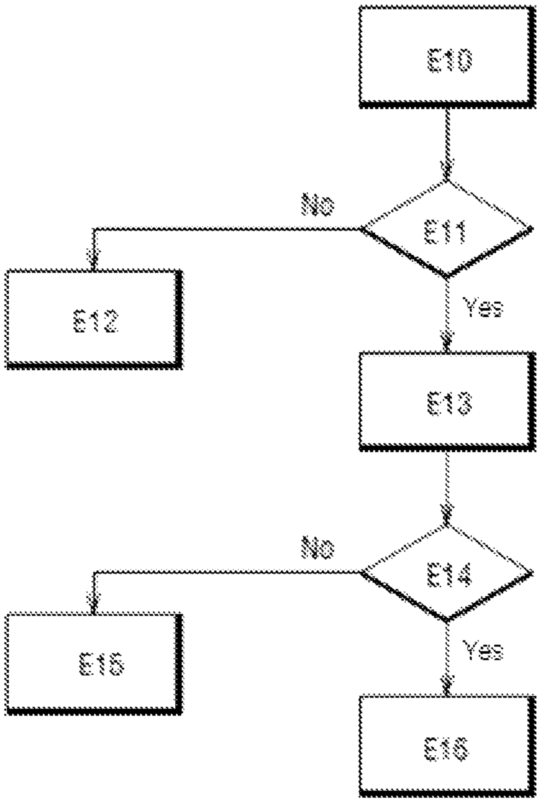
FIG. 3 shows steps of a decision-taking method prior to performing a stage of acoustic recalibration.

With reference to FIG. 3, the description below begins with a decision-taking method for deciding whether the stage of acoustic recalibration is to be performed.

When a third sound signal So3 as produced by at least one third loudspeaker 7*c* is captured by a third microphone 10*c*, the third microphone 10*c* produces a current third reception signal Sr3. The current third reception signal is stored in a nonvolatile memory of the memory module 13 (step E10).

The processor component 12 verifies whether the memory contains at least one preceding third reception signal that was previously output by the same third loudspeaker 7*c* (or the same third loudspeakers 7*c*) and stored by the processor component 12 (step E11).

If not, the decision-taking method comes to an end; the recalibration stage cannot be performed (step E12).

If so, the processor component 12 analyzes the current third reception signal by comparing it with the preceding third reception signals that are stored in the memory (step E13).

The processor component 12 then attempts to detect an acoustic defect from the results of said comparison (step E14).

If no acoustic defect is detected, the decision-taking method comes to an end; the recalibration stage cannot be performed (step E15).

If an acoustic defect is detected, the processor component 12 recalibrates of the smartspeaker 1 in order to correct said acoustic defect (step E16).

In the event that the detected acoustic defect results from high levels of vibration in a certain frequency band, the processor component 12 may decide to limit the level of audio signals output in this frequency band, providing said frequency band is sufficiently narrow. In this example, the processor component 12 decides to limit the level of the audio signals that are output if the width of the frequency band is less than a predetermined threshold. By way of example, the predetermined threshold may be equal to ⅙ of an octave.

Acoustic recalibration may also comprise modifying the audio equalization of an audio channel including the third loudspeaker 7*c* in question, so as to obtain the desired spectral shape (e.g. a flat frequency response).

There follows a description of the second diagnosis, which relates to the audio capture unit 3.

For this second diagnosis, the emission audio test signals comprise a fourth emission signal Se4.

The fourth emission signal Se4 is output via a fourth loudspeaker group comprising at least one fourth loudspeaker 7*d* of the loudspeaker set 6, which thus outputs a fourth sound signal So4.

Figure 4:
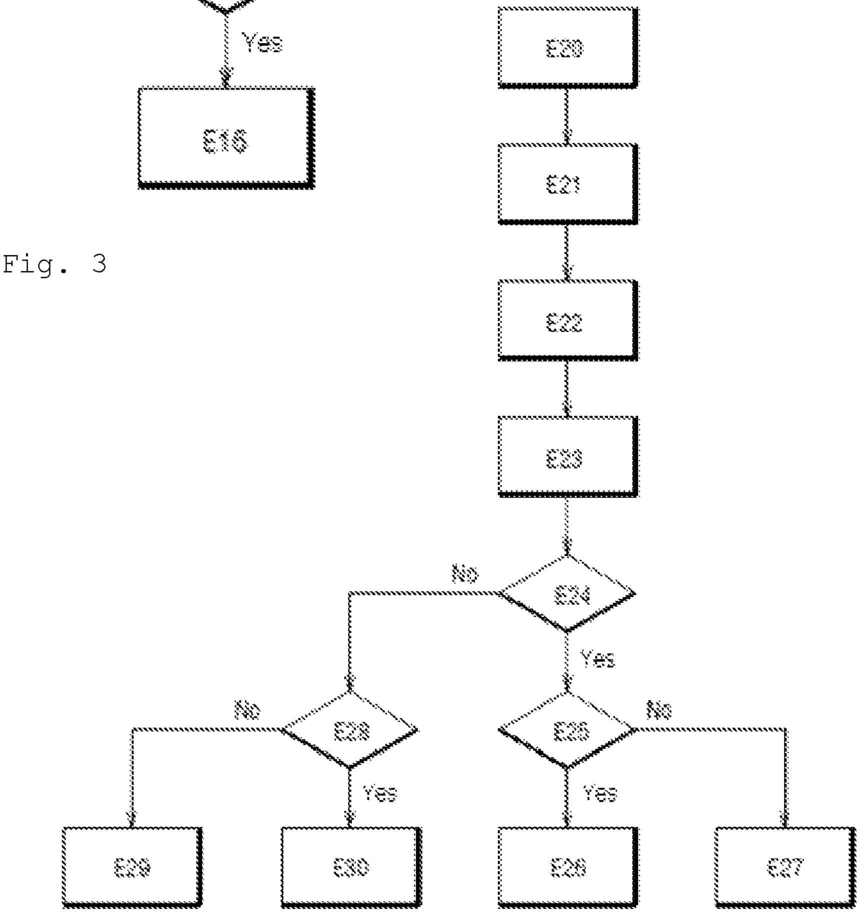
FIG. 4 shows steps of a second diagnosis.

With reference to FIG. 4, in order to perform the second diagnosis, the processor component 12 begins by adjusting the sound volume of the smartspeaker 1 to a predefined level (e.g. 50% or 100% of its maximum volume): step E20. This step is optional.

Thereafter, the processor component 12 uses the loudspeakers set 6 to ask the user to verify that no objects are obstructing the inlets of the microphones 10 of the microphone set 9 or the outlets of the loudspeakers 7 of the loudspeaker set 6 (step E21). This step is optional.

The processor component 12 initializes audio capture by the microphones 10*d*, which are the microphones under test (step E22).

The processor component 12 causes the fourth emission signal Se4 to be output via the fourth loudspeaker group (step E23), thereby producing a fourth sound signal So4.

The processor component 12 then verifies that the fourth sound signal So4 has indeed been received by at least one microphone under test (step E24).

If so, the processor component 12 then verifies that the fourth sound signal So4 has indeed been received by all of the microphones under test (step E25).

If so, the processor component 12 optionally performs the first diagnosis (if it has not been performed already): step E26.

Following step E25, if at least one first microphone under test has indeed received the fourth sound signal So4 and if at least one second microphone under test has not received said fourth sound signal So4, the processor component 12 detects an irremediable failure of the second microphone(s) under test (step E27).

Following step E24, if none of the microphones under test has received the fourth sound signal So4, the processor component 12 asks the user if the user has heard the fourth sound signal So4 (step E28).

If not, the processor component 12 detects an irremediable failure in a first subsystem belonging to the audio playback unit 2 and including the fourth loudspeaker group (step E29).

In contrast, if the user has indeed heard the fourth sound signal So4, the processor component 12 detects an irremediable failure in a second subsystem belonging to the audio capture unit 3 and including the microphones under test (step E30).

Optionally, following step E23 or step E24, if one or more microphones under test have not received the fourth sound signal So4, the processor component 12 can use the loudspeaker set 6 to ask the user to verify that no objects are obstructing the inlets of the microphones 10 in the microphone set 9 or the outlets of the loudspeakers 7 of the loudspeaker set 6 (if this verification has not already been performed). If so, the second diagnosis is relaunched.

Optionally, following step E24, if none of the microphones under test has received the fourth sound signal So4, before asking the user whether the user has heard the fourth sound signal So4, the processor component outputs the fourth sound signal So4 by using a fifth loudspeaker different from the fourth loudspeaker. If the sound signal So4 is now received properly by at least one of the microphones under test, the processor component detects an irremediable failure of the fourth loudspeaker.

It should be observed that it is entirely possible to perform the second diagnosis before the first diagnosis. Under such circumstances, the first diagnosis is performed using only those microphones 10 for which the second diagnosis has not detected a defect.

The invention thus enables mutual self-diagnosis to be performed by using the microphone set 9 to establish the first diagnosis for the audio playback unit 2, and by using the loudspeaker set 6 to establish the second diagnosis for the audio capture unit 3.

The first and second diagnoses may be performed periodically, each time testing all of the loudspeakers 7 or only some of the loudspeakers 7, and each time testing all of microphones 10 or only some of the microphones 10.

Performing the self-diagnosis method regularly serves to solve the problem of any changes to the surroundings of the smartspeaker 1: moving the smartspeaker 1, an object being placed nearby, etc.

Concerning the microphones 10, it should be observed that, while performing the first diagnosis (relating to the loudspeakers 7), it is also possible to test the first microphones 10*a*. For example, following step E2 as shown in FIG. 2, provision may be made to compare with one another the first reception signals Sr1 as produced by the first microphones 10*a*. If the first reception signal Sr1 as produced by one of the first microphones 10*a* is inconsistent with the other first reception signals Sr1 as produced by the other first microphones 10*a*, then the processor component 12 detects a failure of the first microphones 10*a* in question.

The smartspeaker 1 may use the communication module 5 to transmit the results of the tests that have been performed the manufacturer. This information may be directed to a database in order to enable the data to be processed statistically.

The invention minimizes interactions with the user. Nevertheless, when a defect is detected, the smartspeaker 1 may perfectly well inform the user of the presence of that defect and of its nature, and can guide the user in an attempt to correct it. The manufacturer may also potentially contact the user in order to assist the user in solving certain problems reported by the smartspeaker 1.

The invention thus makes it possible to detect an irremediable failure of one or more loudspeakers 7, an irremediable failure of one or more audio channels (amplifier, etc.), or an irremediable failure of one or more microphones 10. The invention also makes it possible to inform the user and/or to act proactively in order to inform the after sales service, and to update statistical data about the product.

The invention also makes it possible to detect sub-optimal use of the audio playback unit 2 (changes in the user's surroundings, natural ageing of audio elements, etc.). The invention also makes it possible to suggest to the user that acoustic recalibration should be performed in order to enable the user to take full advantage of the characteristics and the performance of the smartspeaker 1.

Naturally, the invention is not limited to the implementation described, but covers any variant coming within the ambit of the invention as defined by the claims.

Naturally, the audio playback equipment in which the invention is performed need not necessarily be a smartspeaker, but could be any other electronic equipment including one or more loudspeakers and one or more microphones: a residential gateway, a set-top box, a voice assistant, a tablet, a smartphone, etc.

The emission audio test signals may be pre-recorded, generated by the processor component 12, or indeed obtained from the network via the communication module 5.

The invention claimed is:

1. A self-diagnosis method performed in audio playback equipment comprising an audio playback unit having at least one loudspeaker and an audio capture unit having at least one microphone, the self-diagnosis method comprising the steps of:

acquiring or producing emission audio test signals and outputting them via the loudspeaker(s), thereby producing sound test signals;

acquiring reception audio test signals produced by the microphone(s) as a result of the microphones receiving the sound test signals;

analyzing the reception audio test signals in order to establish a first diagnosis of the audio playback unit and a second diagnosis of the audio capture unit;

the emission audio test signals comprising a first emission signal output by at least one first loudspeaker, and the reception audio test signals comprising at least one first reception signal produced by at least one first microphone, the analysis comprising the step of verifying that the first emission signal is indeed present in the first reception signal;

the method further comprising the steps, if the first emission signal is indeed present in the first reception signal, of detecting a residual noise signal that is also present in the first reception signal, of verifying whether the residual noise signal has a frequency higher than a predefined frequency and a level higher than a predefined level, the predefined frequency being greater than the frequency of the first emission signal and, if so, of detecting a sealing defect in a speaker enclosure of the audio playback equipment incorporating the first loudspeaker.

2. A self-diagnosis method according to claim 1, comprising the step of detecting an irremediable failure of the first loudspeaker if the first emission signal is not present in the first reception signal.

3. A self-diagnosis method according to claim 1, wherein the first emission signal comprises a first sinusoidal signal at a frequency of less than 100 Hz.

4. A self-diagnosis method according claim 1, wherein the emission audio test signals include a second emission signal output by at least one second loudspeaker, and wherein the reception audio test signals include at least one second reception signal produced by at least one second microphone, the second emission signal comprising a succession of second sinusoidal signals presenting distinct second frequencies and forming a frequency sweep, the analysis comprising the steps, for each second sinusoidal signal, of measuring the level of the fundamental and the levels of harmonics of the second reception audio signal, and of detecting an acoustic defect of the second loudspeaker from said measurements.

5. A self-diagnosis method according to claim 4, comprising the step of calculating the ratio between the sum of the levels of the harmonics and the level of the fundamental, and detecting an audio defect from said ratio.

6. A self-diagnosis method according to claim 5, wherein the harmonics are the first five harmonics of the second reception signal, and wherein the detected defect is a defect internal to the second loudspeaker.

7. A self-diagnosis method according to claim 5, wherein the harmonics are the harmonics greater than the tenth harmonic of the second reception signal, and wherein the detected defect is a vibration defect that is manifested by the presence of first vibration levels that are too high at first vibration frequencies.

8. A self-diagnosis method according to claim 7, comprising the steps, if a vibration defect is detected, of asking a user to move the audio playback equipment, then of outputting once again the second emission signal and analyzing once again the second reception signal in order to evaluate second vibration levels at second vibration frequencies, and then of comparing the first vibration levels with the second vibration levels and/or the first vibration frequencies with the second vibration frequencies in order to determine whether the detected defect comes from positioning of the audio playback equipment or from a defect internal to the audio playback equipment.

9. A self-diagnosis method according to claim 1, wherein the emission audio test signals include a third emission signal output by at least one third loudspeaker, and wherein the reception audio test signals include at least a current third reception signal produced by at least one third microphone, the analysis comprising the steps of comparing the current third reception signal with at least one previously recorded preceding third reception signal, of detecting an acoustic defect from results of said comparison, and of performing acoustic recalibration of the audio playback equipment in order to correct said acoustic defect.

10. A self-diagnosis method according to claim 9, wherein the acoustic recalibration comprises modifying the audio equalization of an audio channel that includes the third loudspeaker.

11. A self-diagnosis method according to claim 1, wherein the emission audio test signals include a fourth emission signal output via at least one fourth loudspeaker that thus outputs a sound signal, the self-diagnosis method including the step of verifying that the sound signal has indeed been received by microphones under test.

12. A self-diagnosis method according to claim 11, including the step, if at least one first microphone under test has indeed received the sound signal and if at least one second microphone under test has not received the sound signal, of detecting an irremediable failure of the second microphone under test.

13. A self-diagnosis method according to claim 11, including the step, if none of the microphones under test has received the sound signal, of asking whether a user of the audio playback equipment has heard the sound signal, and:

- if not, of detecting an irremediable failure of the fourth loudspeaker;
- if so, of detecting an irremediable failure of the microphones under test.

14. A self-diagnosis method according to claim 13, further including the steps, prior to asking whether the user has heard the sound signal, of outputting once more the sound signal by using a fifth loudspeaker different from the fourth loudspeaker, and of detecting an irremediable failure of the fourth loudspeaker if the sound signal is indeed received this time by at least one of the microphones under test.

15. Audio playback equipment comprising a processor component, an audio playback unit including at least one loudspeaker, and an audio capture unit including at least one microphone, the self-diagnosis method according to claim 1 being performed in the processor component.

16. Audio playback equipment according to claim 15, wherein the audio playback equipment is a smartspeaker.

17. A non-transitory computer-readable storage medium storing a computer program including instructions for causing a processor component of audio playback equipment to execute the steps of the self-diagnosis method according to claim 1.

* * * * *